United States Patent [19]

Yamamoto et al.

[11] Patent Number: 5,354,595
[45] Date of Patent: Oct. 11, 1994

[54] SURFACE-ROUGHENED POLYESTER FILM

[75] Inventors: Eiji Yamamoto; Tsuneo Tamura; Katsuyuki Touma; Minoru Kishida; Yoshiaki Kozuka; Hiroyuki Matsuda; Hayami Ohnishi; Akira Menjyu; Shouji Nishimoto, all of Kyoto, Japan

[73] Assignee: Unitika, Ltd., Japan

[21] Appl. No.: 903,584

[22] Filed: Jun. 25, 1992

[30] Foreign Application Priority Data

Jul. 2, 1991 [JP] Japan .................................. 3-186950
Sep. 24, 1991 [JP] Japan .................................. 3-272000
Apr. 18, 1992 [JP] Japan .................................. 4-125614

[51] Int. Cl.⁵ ........................ B32B 27/36; B32B 7/10
[52] U.S. Cl. .................... 428/147; 428/331; 428/332; 428/338; 428/339; 428/482; 428/483; 428/473.5; 428/475.2; 428/476.3
[58] Field of Search ............... 428/206, 149, 313, 332, 428/339, 338, 482, 483, 473.5, 475.2, 476.3

[56] References Cited

U.S. PATENT DOCUMENTS 3,958,064  5/1976  Brekkan ............................. 428/336

FOREIGN PATENT DOCUMENTS 0203604  5/1986  European Pat. Off. .
0312616  2/1988  European Pat. Off. .
0398075  5/1990  European Pat. Off. .
55-12368  4/1980  Japan .
55-155029 12/1980 Japan .
58-28096  6/1983  Japan .
59-10893  3/1984  Japan .
63-068659 9/1986  Japan .

Primary Examiner—P. C. Sluby
Attorney, Agent, or Firm—Lorusso & Loud

[57] ABSTRACT

A surface-roughened film and methods for fabricating same. The film has good transparency/exceptional clarity and high lubricity so that it is useful for a photoengraving material, label, packaging film, magnetic recording film, or clear film. The film has a composition including thermoplastic polyester resin (a) and a thermoplastic resin (b), such as an amorphous nylon, having glass transition temperature preferably 10° C. higher than that of the thermoplastic polyester resin (a) and a critical surface tension more than 0.1 dyne/cm different from that of the thermoplastic polyester resin (a). Resin (b) further has a melt viscosity, at a temperature of 280° C. and shear rate of $10^2$ sec$^{-1}$, in the range of 500 to 50,000 poise. One or more particulate inert inorganic compound may be added and the film may be laminated to layers of other polymers with the film of the foregoing composition on at least one surface thereof. On the film surface, microprotuberances cored with the thermoplastic resin (b) are formed.

In addition, there are also provided methods for fabricating the surface-roughened film including drawing the film in at least one direction by a factor of at least one and one-half at a temperature between Tg of (a) and Tg of (b).

16 Claims, No Drawings

SURFACE-ROUGHENED POLYESTER FILM

BACKGROUND OF THE INVENTION

1. Technical Field of the Invention

This invention relates to a surface-roughened film and methods for fabricating such a film. The surface-roughened film has good transparency/exceptional clarity and high lubricity so that it is useful for a photoengraving material, a label, a packaging film, a magnetic recording film, and a clear film.

2. Description of the Prior Art

A polyester film represented by a polyethylene terephthalate film exhibits exceptional physical and chemical properties, so that it can be applied for various products such as a magnetic recording material, a wrapping material, an electrical material, a sensitized material, and many photographic materials.

For example, it is well known that the polyester films dominate the market share in the magnetic tape industries and the lubricity (slip characteristics) of the film significantly affects the manufacturing process or succeeding processing of the films and, in turn, affects the quality of intermediate or end products.

In order to obtain this lubricity, particulate inorganic compounds are generally incorporated into the polymer to generate irregularity on the surface of the film by means of drawing. Such a technique is described in, for example, the Japanese Patent Unexamined Publication No.63-137927. However, in such a process it is difficult to uniformly disperse the fine particles because the particulate inorganic compounds tend to aggregate or agglomerate with each other. With respect to this problem, Japanese Patent Unexamined Publication No.63-66222 describes a method in which the particulate inorganic compounds are added to the polymer on its polymerization.

Recently, transparent films are in great demand. Higher transparency is required for polyester film, which is so called "thick-walled film", having a thickness in the range of 50 to 200 μm which is useful for a microfilm, an electrophotograph, an X-ray photograph, a diazo print, a slidefilm (filmstrip) for an overhead projector (OHP), a label, and a laminated film. Generally, a thick film absorbs and scatters more light compared with a thin film, so that the transparency is reduced though thick-walled film having high transparency has also been commercially available.

However, as described below, such films are not easy to handle. More particularly, films are generally fabricated in various steps such as drawing, rolling, slitting and working before use as end products. It is indispensable to prevent blocking of the film and to add the lubricity to the film for facilitating handling thereof when passing through these steps. Troublesome handling in these steps results in defective end products. In order to facilitate handling, the film is usually incorporated with particulate inert materials of inorganic compounds to cause adequate irregularity on the film surface and thereby prevent blocking of the films. In addition, incorporation of such particles contributes to the proper lubricity between films and, in turn, prevents trouble accompanying rolling-up of the films used as intermediates or end products. The above-mentioned lubricity of the film is improved with reduction of processing problems by increasing the volume of the added particles, but the increased amount of particulate additive is disadvantageous in that it lowers the transparency of the film and causes some loss of the desired optical characteristics and visual appearance of the film.

On the other hand, for increasing the desired transparency of the film it is necessary to reduce the volume of the added particulate inert materials of the inorganic compound, resulting in lower lubricity of the film and causing troubles in handling. One example of such handling trouble caused by the lower lubricity is that small protuberances are generated on the film surface of a rolled film upon rolling up the films after drawing. An excessive amount of such protuberances may cause not only bad appearance of the film but also considerable damage to the film used in industries where precision and accuracy of the film transparency are required for optical, photographic, or graphical purposes. Thus, it is difficult to satisfy both transparency and lubricity, which are antipodal properties.

In addition, in the above-mentioned method where the particulate inert materials of an inorganic compound are added, the productivity of the film is exceedingly low because of clogging of a screen with the inorganic particles in filtering during melt film formation. While a screen having a larger mesh size may allow some foreign matter to be incorporated into the film, this is disadvantageous in that such a film is often broken upon drawing. Further, even a small amount of inorganic particles may cause wearing of the T-die lip or T-die blade used in melt film formation over a long period. Accordingly, a solution to the above-mentioned problem has long been desired. The incorporated particles also affect lifetime of a knife used in a slitting process or other cutting process of the film, that is, an exceedingly shortwearing knife will necessitate frequent replacement of the knife, resulting in reduced productivity. In addition, the film with some additive or foreign matters is disadvantageous when being used for a magnetic tape or other magnetic recording media, because a head of a recorder may be worn by the incorporated particles.

Conventionally, most solutions proposed for the above-mentioned "thick-walled film" compromise between transparency and lubricity of the film rather than attempting to improve both together. For example, the compromise solutions include highly controlled processing conditions with expensive plant investment and reduction of processing speeds or take-up speeds.

However, it would be highly desirable for a thick-walled transparent film to have both improved transparency and lubricity without improvement in the fabricating device in view of the necessity for increasing processing speeds and improving productivity.

OBJECT OF THE INVENTION

An object of the present invention is to provide a polyester film having, in particular, good transparency/exceptional clarity and high lubricity.

SUMMARY OF THE INVENTION

According to a first aspect of the present invention, a surface-roughened film includes a layer of a thermoplastic polyester resin (a) in an amount within the range of 97 to 99.99 wt. %; and a thermoplastic resin (b) in an amount within the range of 0.01 to 3 wt. % and having a glass transition temperature higher than that of the thermoplastic polyester resin (a), a critical surface tension more than 0.1 dyne/cm different from that of the thermoplastic polyester resin (a), and a melt viscosity, at a temperature of 280° C. and shear rate of $10^2 \text{sec}^{-1}$, in the range of 500 to 50,000 poise, optionally laminated film laminated with other polymers such that the foregoing composition forms at least one surface thereof. Micro-protuberances having cores of thermoplastic resin (b) are present on the surface of the aforementioned layer or that of the laminated film.

Preferably, the three dimensional center plane average roughness (SRa) of the surface-roughened film is within a range of 0.005 to 0.05 μm, and the three dimensional ten point average roughness (SRz) is within a range of 0.06 to 0.4 μm.

According to a second aspect of the present invention, a surface-roughened film is a film of a thermoplastic polyester resin (a) in an amount in the range of 96.9 to 99.9899 wt. %; a thermoplastic resin (b) in an amount in the range of 0.01 to 3 wt. %; and particulate inert materials of inorganic compound (c) in an amount in the range of 0.0001 to 0.1 wt. % and having an average particle size in the range of 0.2 to 4.0 μm, or is a laminate film wherein the film is laminated to layers of other polymers such that the film forms at least one surface of the laminate. Again, micro-protuberances having cores of thermoplastic resin (b) are present on the surface of the film or that of the laminate.

Preferably, the three dimensional center plane average roughness (SRa) of the surface-roughened film is within a range of 0.007 to 0.07 μm, and the three dimensional ten point average roughness (SRz) is within a range of 0.1 to 0.5 μm.

In the first and second aspects of the present invention, it is preferable that the refractive index of the thermoplastic resin (b) be within the range of 1.45 to 1.68 and mean dispersed particle size be within the range of 0.01 to 1.0 μm.

According to a third aspect of the present invention, a method for making a surface-roughened film includes drawing by a factor of one and half in at least one direction, an undrawn film of a composition (I) containing a thermoplastic polyester resin (a) in an amount in the range of 97 to 99.99 wt. %; and a thermoplastic resin (b) in an amount in the range of 0.01 to 3 wt. %, or a laminate including a film of composition (I) is forming at least one surface thereof, at a temperature between the glass transition temperature of the thermoplastic polyester resin (a) and the glass transition temperature of the thermoplastic resin (b).

According to a fourth aspect of the present invention, a method for making a surface-roughened film includes drawing by a factor of one and half in at least one direction, an undrawn film of a composition (II) containing a thermoplastic polyester resin (a) in an amount in the range of 96.9 to 99.9899 wt. %; a thermoplastic resin (b) in an amount in the range of 0.01 to 3 wt. %; and particulate inert materials of an inorganic compound (c) in an amount in the range of 0.0001 to 0.1 wt. %, and having an average particle size in the range of 0.2 to 4.0 μm, or is a laminate including film of composition (II) forming at least one surface thereof, at a temperature between the glass transition temperature of the thermoplastic polyester resin (a) and the glass transition temperature of the thermoplastic resin (b).

DETAILED DESCRIPTION OF THE PREFERRED EMBODIMENTS

The compositions of thermoplastic polyester resin according to the present invention are based on a combination of mixed residues of aromatic dicarboxylic acid, aliphatic diol and/or alicyclic diol.

The following are examples of species containing an aromatic dicarboxylic acid: 1,4-benzenedicarboxylic acid (terephthalic acid), 1,3-benzenedicarboxylic acid (isophthalic acid), and naphthalene dicarboxylic acid. The aromatic rings of these aromatic dicarboxylic acids may be substituted by halogens, alkyls or other substituents.

The following are examples of the aliphatic diol and/or alicyclic diol: 1,2-ethanediol (ethylene glycol), bis(2-hydroxyethyl) ether (diethylene glycol), 1,2-propanediol (propylene glycol), 1,3-butanediol (butylene glycol), 2,2-dimethyl1,3-propanediol (neopentyl glycol), and cyclohexylene dimethanol. It is possible to use two or more of aliphatic diols and/or alicyclic diols in combination.

The following are examples of the thermoplastic polyester resin (a): polyethylene terephthalate (PET), polybutylene terephthalate (PBT), polyethylene-2,6-naphthalate (PEN), poly-1,4-cyclohexylene dimethylene terephthalate (PCT) and poly-p-ethylene oxybensoate (PEOB). These resins satisfy the requirements for a polyester resin film in an economic and efficient manner. It is noted that the glass transition temperature (hereinafter, referred as Tg) of the thermoplastic polyester resin (a), which is important relative to Tg of the thermoplastic resin (b), can be measured by means of a differential scanning colorimetry (DSC) technique. The value of this glass transition temperature is generally 70° C. for PET, 50° C. for PBT, 120° C. for PEN, 95° C. for PCT, and 60° C. for PEOB. It is readily understood that other components may be incorporated into these thermoplastic polyester resins as a comonomer to such a degree that the film formation is not impeded. It is also readily understood that the thermoplastic polyester resin (a) may be a composition of PET and a thermoplastic polyester resin (a) other than PET.

There is no restriction regarding molecular weight of the thermoplastic polyester resin (a) used in the present invention and the only necessity is the film formation ability thereof. However, it is preferable that the intrinsic viscosity thereof is not less than 0.4(dl/g), measured at a temperature of 25° C. and dissolved in a mixed solvent of phenol/tetrachloroethane of 1:1 (weight ratio).

The thermoplastic resin (b) used in the present invention has a Tg higher than that of the thermoplastic polyester resin (a) and a critical surface tension which is more than 0.1 dyne/cm different from that of the thermoplastic polyester resin (a). Such Tg and critical surface tension is determined so as to satisfy the following requirements. The compositions are formed as molten mixtures of the thermoplastic polyester resin (a) as a matrix component (continuous phase) and the thermoplastic resin (b) as an island component (dispersed phase). This mixture is extruded in the form of a film and then drawn into the surface-roughened film. Thus, the present invention will not be achieved if the critical surface tension of the thermoplastic resin (b) is equal to or approximate that of the thermoplastic polyester resin (a) because of the compatibility between the thermoplastic polyester resin (a) and the thermoplastic resin (b). In addition, if the thermoplastic resin (b) has a lower Tg compared with that of the thermoplastic polyester resin (a) the thermoplastic resin (b) will be deformed into smooth plane when the thermoplastic polyester resin (a) is drawn. This means that the thermoplastic resin (b) will not form cores (i.e. the island components of the thermoplastic resin (b) are formed as cores in the thermoplastic polyester resin (a) because of non-compatibility therebetween) and the desired micro-protuberances on the film surface will not be formed. There is more than 0.1 dyne/cm difference in the critical surface tensions of the thermoplastic polyester resin (a) and the thermoplastic resin (b), are more preferably, more than 0.5 dyne/cm. In addition, the Tg of the thermoplastic polyester resin (a) is preferably 10° C. higher than, and more preferably, 20° C. higher than the Tg of the thermoplastic resin (b).

It is necessary that the melt viscosity of the thermoplastic resin (b) at a temperature of 280° C. and a shear rate of $10^2 sec^{-1}$ be in the range of 500 to 50,000 poise, and is preferably in the range of 1,000 to 30,000 poise. When the melt viscosity is lower than 500 poise, then smaller particles of the thermoplastic resin (b) are dispersed in the matrix of the thermoplastic polyester resin (a), which results in insufficient lubricity of the film. On the other hand, when the melt viscosity is higher than 50,000 poise, then larger particles of the thermoplastic resin (b) are generated resulting in insufficient transparency of the film. The refractive index of the thermoplastic resin (b) is preferably in the range of 1.45 to 1.68. The film with a refractive index of less than 1.45 exhibits insufficient transparency. The transparency is improved as the refractive index approaches to 1.68. A refractive index of more than 1.68 may be used if a thermoplastic resin having such viscosity of more than 1.68 is not readily available. In the surface-roughened film according to the present invention, the thermoplastic resin (b) of the discontinuous phase (island component) is dispersed in the thermoplastic polyester resin (a) of the continuous phase (matrix component). It is preferable that the thermoplastic resin (b) is dispersed in the form of approximately spherical particles. Preferably, the average dispersed particle size is in the range of 0.005 to 2.0 μm, and more preferably, in the range of 0.01 to 1.0 μm.

In the surface-roughened film according to the present invention, the micro-protuberances present on the surface of the film are formed with cores of thermoplastic resin (b) when particulate inert materials of inorganic compound (c) described below are not present. Preferably, the surface roughness of the film is in the range of 0.001 to 0.1 μm, and more preferably, in the range of 0.005 to 0.05 μm, measured by the three dimensional center plane average roughness (SRa) and in the range of 0.01 to 0.8 μm, and more preferably, in the range of 0.06 to 0.4 μm, measured by the three dimensional ten point average roughness (SRz). The lubricity of the film is not sufficient with a SRa of smaller than 0,001 μm or with a SRz of smaller than 0.01 μm while the transparency of the film is not sufficient with a SRa of larger than 0 1 μm or with a SRz of larger than 0.8 μm. It is noted that SRa represents the mean distance of the peak and valley from the center plane where the total area of the island is equal to that of the matrix on the film surface. SRz represents the distance between the average of first to fifth highest peaks and the average of first to fifth deepest valleys.

The thermoplastic resin (b) used in the present invention is exemplified by polystyrene, polymethyl methacrylate, polycarbonate, polyarylate, polyethersulphone, amorphous nylon, amorphous polyolefin, and maleimide copolymeric resin.

Suitable for use as the above-mentioned amorphous nylon, are polyamides which contain, as a copolymer, 5-tert-butyl 1,3-benzenedicarboxylic acid (5-tert-butyl isophthalic acid), 1,3-trimethyl-3-phenylindan-3',5-dicarboxylic acid, 3-aminomethyl-3,5,5-trimethylcyclohexylamine, 1,3-diaminocyclohexane, m-xylylendiamine, 1,3-bis(aminomethyl) cyclohexane, 2,4,4-trimethyl hexamethylenediamine, bis(4-aminocyclohexyl) methane, bis(4-amino-3-methylcyclohexyl)methane.

Such polyamides can be obtained by means of well-known polycondensation technique using polyamide forming components such as: 1,2-diaminoethane(ethylenediamine), 1,4-diaminobutane(tetramethylenediamine), 1,6-diaminohexane(hexamethylenediamine), phenylenediamine, hexanedioic acid(adipic acid), decanedioic acid(sebacic acid), cyclohexanedicarboxylic acid, 1,3-benzenedicarboxylic acid(isophthalic acid), 1,2-benzenedicarboxylic acid(phthalic acid), 1,4-benzenedicarboxylic acid (terephthalic acid), naphthalenedicarboxylic acid, ε-aminocaproic acid, ω-aminododecanoic acid, aminobenzoic acid, ε-caprolactam and ω-laulolactam.

Preferably, the Tg of the amorphous nylon is at least 10° C. higher than, and more preferably, at least 20° C. higher than the Tg of the thermoplastic polyester resin (a). The surface-roughening may be more effectively made with the higher Tg. However, it is preferable that the Tg be not higher than 200° C. for processability on melt molding.

The maleimide copolymeric resin used in the present invention contains at least monomers of maleimide and an aromatic vinyl compound, and if necessary, also contains an unsaturated dicarboxylic anhydride monomer or other copolymerizable monomer.

The following are representative of such maleimide monomers: maleimide, N-methylmaleimide, N-ethylmaleimide, N-propylmaleimide, N-hexylmaleimide, N-cyclohexylmaleimide, N-phenylmaleimide, N-tolylmaleimide, N-(phenylhalide)maleimide, N-(alkyl phenyl)maleimide, N-(nitrophenyl)maleimide, N-(hydroxyphenyl)maleimide, N-naphthylmaleimide, α-chloro-N-phenylmaleimide, and α-methyl-N-phenylmaleimide.

The following are representative of the aromatic vinyl monomers: styrene, α-methylstyrene, vinyltoluene, t-butyl styrene, and styrene halide.

The following are representative of the unsaturated dicarboxylic anhydride monomers: maleic anhydride (2,5-furandione), methyl maleic anhydride, 1,2-dimethyl maleic anhydride, ethyl maleic anhydride, and phenyl maleic anhydride.

The other copolymerizable monomer is an acrylic monomer, which may be: methylacrylate, methylmethacrylate, ethylacrylate, ethylmethacrylate, butylacrylate.,butylmethacrylate, hexylacrylate, hexylmethacrylate, cyclohexylacrylate, cyclohexylmethacrylate, decylacrylate, decylmethacrylate, octadecylacrylate, octadecylmethacrylate, hydroxyethylacrylate, hydroxyetylmethacrylate, methoxyethylacrylate, methoxyethylmetacrylate, glycidylacrylate and glycidylmetacrylate.

The maleimide copolymeric resin used as the thermoplastic resin (b) in the present may, for example, have a maleimide monomer content of 5 to 50 mol %, an aromatic vinyl monomer content of 30 to 90 mol %, an unsaturated dicarboxylic anhydride monomer content of 0 to 50 mol % and other copolymerizable monomers in the amount of 0 to 50 mol %. With a aromatic vinyl monomer content of more than 90 mol %, the Tg of the maleimide copolymeric resin will be undesirably reduced. With a maleimide monomer content of more than 50 mol % or an unsaturated dicarboxylic anhydride monomer content of more than 50 mol %, it becomes difficult to industrially manufacture a homogeneous copolymeric resin. It is also undesirable that the other copolymerizable monomer be more than 50 mol % because Tg of the maleimide copolymeric resin is reduced and the heat stability of the composition is reduced.

The maleimide copolymeric resin used in the present invention can be made by means of well-known free-radical polymerization techniques. The maleimide copolymeric resin may be prepared by reacting the copolymer of the unsaturated dicarboxyl ic acid anhydride monomer, the aromatic vinyl monomer and, if required, another copolymerizable monomer with ammonia or a primary amine to convert all or a part of the anhydride groups into imides. The maleimide copolymeric resin can be manufactured by means of this reaction as imides by reaction between the polymers having the anhydride groups and amine compounds according to methods disclosed in, for example, Japanese Patent Examined Publication Nos. 61-26938 and 62-8456.

The maleimide copolymeric resin used in the present invention has a Tg which is 10° C. higher than, and more preferably, 20° C. higher than that of the thermoplastic polyester resin (a). If the Tg of the maleimide copolymeric resin is equal to or lower than that of the thermoplastic polyester resin, the drawing of the film will cause plastic deformation of the maleimide copolymeric resin therein and fine irregularities on the surface of the film will not form sufficiently. With the maleimide copolymeric resin having such a lower Tg, the resulting polyester film has insufficient lubricity.

There is no restriction regarding the molecular weight of the maleimide copolymeric resin used in the present invention, and it is sufficient that the molecular weight be such as to provide a melt viscosity of 500 to 50,000 poise at a temperature of 280° C. and the a shear speed of $10^2 sec^{-1}$.

In the present invention, it is preferable to use amorphous polyolefin as the thermoplastic resin (b) with a Tg is at least 10° C. higher than that of the thermoplastic polyester resin (a) such as a copolymer of norbornene/ethylene, a hydrogenate of ring opened polymer of dicyclopentadiene, random copolymers of ethylene/1,4,5,8-dimethanol, 2,3,4,4a, 5,8,8a-octahydronaphthalenes (for example, ethylene/2-ethyl-1,4,5,8-dimethano-1,2,3,4,4a, 5,8,8a-octahydronaphthalene, ethylene/2-methyl-1,4,5,8-dimethano-1,2,3,4,4a, 5,8,8a-octahydronaphthalene, ethylene/2-propyl-1,4,5,8-dimethano-1,2,3,4,4a, 5,8,8a-octahydronaphthalene, ethylene/2-hexyl-1,4,5,8-dimethano-1,2,3,4,4a, 5,8,8a-octahydronaphthalene, ethylene/2-stearyl-1,4,5,8-dimethano-1,2,3,4,4a, 5,8,8a-octahydronaphthalene, ethylene/2,3-dimethyl-1,4,5,8-dimethano-1,2,3,4,4a,5,8-,8a-octahydronaphthalene, ethylene/2-methyl-3-ethyl-1,4,5,8-dimethano-1,2,3,4,4a,5,8,8a-octahydronaphthalene, ethylene/2-chloro-1,4,5,8-dimethano-1,2,3,4,4a,5,8-,8a-octahydronaphthalene, ethylene/2-bromo-1,4,5,8-dimethano-1,2,3,4,4a,5,8,8a-octahydronaphthalene, ethylene/2-fluoro-1,4,5,8-dimethano-1,2,3,4,4a,5,8,8a-octahydronaphthalene, and ethylene/2,3-dichloro-1,4,5,8-dimethano-1,2,3,4,4a,5,8,8a octahydronapbthalene) and copolymers of ethylene and at least one cyclic olefin selected from a group including cycloalkene and tricycloalkene (for example, bicyclo[2.2.1]hepto-2-ene, 6-methylbicyclo[2.2.1]hepto-2-ene, 5,6-dimethylbicyclo[2.2.1]hepto-2-ene, 1-methylbicyclo[2.2.1]hepto-2-ene, 6-ethylbicyclo[2.2.1]hepto-2-ene, 6-n-butylbicyclo[2.2.1]hepto-2-ene, 6-i-butylbicyclo[2.2.1]hepto-2-ene, 7-methylbicyclo[2.2.1]hepto-2-ene, tricyclo[4.3.0.1$^{2,5}$]-3-decene, 2-methyltricyclo[4.3.0.1$^{2,5}$]-3-decene, 5-methyltricyclo[4.3.0.1$^{2,5}$]-3-decene, tricyclo[4.4.0.1$^{2,5}$]-3-decene, and 10-methyltricyclo[4.4.1.1$^{2,5}$]-3-decene).

The typical amorphous polyolefin used in the present invention is a copolymer of ethylene and the above-mentioned cyclic olefin. The content of the cyclic olefin component in the copolymer is generally more than 10 mol % and less than 60 mol %, and that of the ethylene component is generally more than 40 mol % and less than 90 mol %. Other copolymerizable unsaturated monomers may be copolymerized with these two components, as needed, consistent with achievements of the object of the present invention. The copolymerizable unsaturated monomers are, for example, α-olefin of $C_3$ to $C_{20}$ such as propylene, 1-butene, 4-methylpentene-1, 1-hexene, 1-octene, 1-decene, 1-dodecene, 1-tetradecene, 1-hexadecene, 1-octadecene, and 1-eicosene, cyclopentene, cyclohexene, 3-methylcyclohexene, cyclooctene, 1,4-hexadiene, 4-methyl-1-hexadiene, 5-methyl-1,4-hexadiene, 1,7-octadiene, dicyclopentadiene, 5-ethylidene-2-norbornene, 5-vinyl-2-norbornene, tetracyclodecene, 2-methyltetracyclodecene, and 2-ethyltetracyclododecene.

The copolymer may be made by a liquid phase polymerization method. The cyclic olefin copolymer can be obtained in accordance with a method disclosed in, for example, Japanese Patent Unexamined Application Publication No. 61-271308.

The amorphous polyolefin used in the present invention has a Tg which is at least 10° C. higher, and preferably at least 20° C. higher than the Tg of the thermoplastic polyester resin (a). If the Tg of the maleimide copolymeric resin is equal to or lower than that of the thermoplastic polyester resin, the drawing of the film made will cause plastic deformation of the maleimide copolymeric resin therein and fine irregularities on the surface of the film will not form sufficiently.

There is no restriction regarding the molecular weight of the maleimide copolymeric resin used in the present invention, and such molecular weight need only be such to provide a melt viscosity of 500 to 50,000 poise at a temperature of 280° C. and a shear speed of $10^2 sec^{-1}$.

Where the surface-roughened film according to the present invention contains the particulate inert materials of inorganic compound (c), these particles may be added into the film at any time. However, it is more effective to add during estelification after proceeds substantial polycondensation. It is also possible to directly incorporate these particulate materials of an inorganic compound into the thermoplastic polyester resin (a) to be formed into a film. However, such method requires that the particulate inert materials of inorganic compound (c) be uniformly well dispersed in the thermoplastic polyester resin (a).

In order to sufficiently disperse the particulate inert materials of inorganic compound (c) in the thermoplastic polyester resin (a), the particles should be ground into primary particles by using well-known devices such as an agitator, a sand mill, or a high-pressure dispersing machine. It is understood that a well-known polymerization method is preferably used so that the particles are prevented from becoming aggregated or agglomerated with each other in the thermoplastic polyester resin (a) or that a dispersing agent should be added.

In addition, in order to improve the adhesive properties of the thermoplastic polyester resin and to prevent occurrence of voids, the surface of the particulate inert materials of inorganic compound (c) may be previously treated. In this event, it is possible to use both chemical treatments such as a treatment with a silane coupling agent and a method applying a coating of acrylic compounds such as acrylic acid and acrylic ester and physical treatments such as corona (discharge) treatment.

Preferably, the average particle size of the particulate inert materials of inorganic compound (c) according to the present invention is within a range of 0.2 to 4.0 $\mu$m, and more preferably, within a range of 1.0 to 3.5 $\mu$m. The particulate inert materials of inorganic compound (c) having an average particle size of smaller than 0.2 $\mu$m will not contribute to effectively improve the lubricity of the film, that is, there is no purpose to add such particles. On the other hand, an average particle size of larger than 4.0 $\mu$m serves to degrade the film appearance into an unclear or opaque film because the appearance of the film is highly related to their size. In addition, the refractive index of the particulate inert materials of inorganic compound (c) is preferably in the range of 1.40 to 1.68. If the refractive index is less than 1.40, which is significantly different from the refractive index of the polyester matrices, the transparency of the film will be decreased because of high reflection and refraction of light at interfaces between dispersed particles and polyester resin matrix. The transparency of the film is improved as the refractive index approaches 1.68, which is approximately the refractive index of the drawn polyester film. The following minerals are generally, but not necessarily used as the particulate inert materials of an inorganic compound: silica, calcium carbonate, alumina, talc, kaolin, zeolite, and aluminosilicate. The only important factor is the particle size.

The amount of the particulate inert materials of inorganic compound (c) used in this invention is preferably in the range of 0.0001 to 0.1 wt. %, and more preferably, 0.0001 to 0.05 wt. %, of the composition to be formed into a film.

When the particulate inert materials of inorganic compound (c) are contained in the surface-roughened film according to the present invention, it is preferable that the surface roughness SRa of the surface-roughened film be in the range of 0.001 to 0.2 $\mu$m and 0.007 to 0.07 $\mu$m is more preferable, and that SRz is within the range of 0.1 to 2.0 $\mu$m, and more preferably in the range of 0.1 to 0.5 $\mu$m. The lubricity is insufficient with a SRa of smaller than 0,001 $\mu$m and a SRz of smaller than 0.1 $\mu$m, while the transparency of the film is insufficient with a SRa of larger than 0.2 $\mu$m and a SRz of larger than 2.0 $\mu$m.

The surface-roughened film according to the present invention may include, in addition to the particulates of an inorganic compound, well-known organic slip agents, lubricants, antioxidants, anti-weathering agents, flame-retardants, antistatic agents, and some colorants, consistent with achievement of the object of the present invention.

The content of the thermoplastic resin (b) in the surface-roughened film according to this invention is in the range of 0.01 to 3.0 wt. % of the composition, and preferably, in the range of 0.05 to 0.5 wt. %. This amount of thermoplastic resin (b) mixed with the thermoplastic polyester resin (a) can be controlled in size at submicron (i.e. smaller than 1 $\mu$m), notwithstanding shearing stress when melted and mixed in a single or twin screw extruder.

With the surface-roughened film of the present invention, the effects of the invention can be equally obtained where one or more kinds of thermoplastic resins (b) are incorporated in the thermoplastic polyester resin (a). However, more advantageous effects can be obtained with the particulate inert inorganic compound (c) in an amount within the range of 0.0001 to 0.1 wt. %, and more preferably, 0.0001 to 0.05 wt. %, coexistent with the thermoplastic resin (b).

A surface-roughened film of the present invention may be a singlelayer film of a composition containing the thermoplastic polyester resin (a) and the thermoplastic resin (b) or a single-layer film of a composition containing the thermoplastic polyester resin (a), the thermoplastic resin (b) and the particulate inert inorganic compound (c), and may be one layer of a laminated film. In case of the laminated film, the layer made of one of the foregoing compositions is laminated with other layers so that it forms a surface layer on one or both sides of the film. Such a film is advantageous in that the transparency of the film is improved as well as its economy. As the "other layers", thermoplastic polyester resins are generally used such as PET, PBT, PEN, and PCT selected from the group including the thermoplastic polyester resin (a).

The surface-roughened film of the present invention is made by means of drawing an undrawn film of the composition containing the thermoplastic polyester resin (a) and the thermoplastic resin (b) or the composition containing the thermoplastic polyester resin (a), the thermoplastic resin (b), and the particulate inert inorganic compound (c) or by means of drawing an undrawn laminate-film with a surface layer of such a composition. The drawing is at a temperature within the range of the Tg of the thermoplastic polyester resin (a) through the Tg of the thermoplastic resin (b). More particularly, the method used herein melts and mixes, in a single or twin screw extruder, the thermoplastic polyester resin (a) and the thermoplastic resin (b), or the thermoplastic polyester resin (a), the thermoplastic resin (b), and the particulate inert inorganic compound (c) to form a fine dispersion of the thermoplastic resin (b) in the thermoplastic polyester resin (a). The resulting composition alone or with other polymers, if laminated, is melt extruded into a film by using a T-die or a circular die with cooling by a casting roll or cooling with liquid/air. The resulting undrawn film has relatively smooth surfaces, which become irregular upon being drawn. In this event, it is required that the drawing temperature be in the range of the Tg of the thermoplastic polyester resin (a) through the Tg of the thermoplastic resin (b). The drawing is not effective at a temperature lower than the Tg of the thermoplastic polyester resin (a), while the desired surface irregularities are not readily obtained at a temperature higher than the Tg of the thermoplastic resin (b). The draw ratio is one and one-half or more in both longitudinal and transverse directions (i.e. machine and cross-machine directions) for uniaxial drawing. Biaxial drawing is desirable where the better film can be obtained. In this event, it is desirable to draw the film by not less than a factor of one and one-half, and preferably, by not less than a factor of three in both longitudinal and transverse directions.

Any one of the drawing methods available such as the uniaxial drawing, sequential biaxial drawing, and simultaneous biaxial drawing may be used. In addition, various types of drawing machines can be used such as a twin roll uniaxial drawing machine, a tenter transverse drawing machine, simultaneous biaxial drawing machine, and a tubular simultaneous biaxial drawing machine.

When using only the particulate inert inorganic compound (c) as the anti-blocking agent, the haze (Hz) of a well-transparent film is in the range of 0.3 to 2.5 %. However, the film of the type described tends to cause protuberances on a rolled film upon rolling up the film due to a static friction coefficient by line press method of more than 2.5, which may be a defect in that a well-rolled film is not readily obtained.

In the surface-roughened film according to the present invention, the film thickness converted value Hz is, as a 100 μm converted value., 0.3 to 2.5 %, the static friction coefficient by line press method (μs-2) under loading of 1,000 g/cm is less than 2.4, and a gloss rate (G %) is 180 to 250%.

According to the surface-roughened film and the method for fabricating such film of the present invention, a surface-roughened film can be manufactured with addition of synthetic organic resins, which is difficult using a conventional methods. Such a film has varied considerably in various industries in its working properties. mechanical properties, lubricity and transparency.

The surface-roughened film provided in accordance with the present invention is useful as a photoengraving material, a label, a wrapping film, a magnetic recording film, and a clear film or other products.

A more detailed description will be provided by the following examples.

Thermoplastic polyester resin

The thermoplastic polyester resin (a) used in this embodiment is as described in the following Table 1.

TABLE 1

| Thermoplastic polyester resin | | Intrinsic Viscosity [η] | Critical Surface Tension (dyne/cm) | Tg (°C.) |
|---|---|---|---|---|
| A-1 | Polyethylene terephthalate | 0.78 | 41 | 70 |
| A-2 | Polyethylene naphthalate | 0.70 | 38 | 120 |

Synthesis of amorphous nylon

Prepared in a reactor was 10 Kg of a raw material containing 45 mol % 1,3benzenedicarboxylic acid (isophthalic acid), 5 mol % 1,4-benzenedicarboxylic acid (terephthalic acid), 45 mol % hexamethylene diamine, 5 mol % of bis(4-amino-3-methylcyclohexyl) methane and 0,015 mol % acetic acid and 8 Kg pure water. The air within the reactor is purged by using nitrogen. The temperature was raised up to 90° C. for about five hours, then the reaction temperature was gradually raised up to 280° C. for over ten hours under pressure (18 bar) while agitating the reactor. The pressure was decreased to atmospheric pressure to polymerize for six hours at the same temperature. After the reaction, the resulting nylon was taken from the reactor and cut into pellets. The relative viscosity of this nylon (B-i), measured in the amount of lg/dl in m-cresol at a temperature of 20° C., was 1.50 and its Tg was 150° C. Other amorphous nylons were polymerized in the same manner. The result are shown in Table 2.

TABLE 2

| | 1 | 2 | 3 | 4 | 5 | 6 | 7 | 8 | Melt Viscosity (poise) | Tg (°C.) |
|---|---|---|---|---|---|---|---|---|---|---|
| B-1 | 45 | 5 | 45 | 5 | — | — | — | — | 2600 | 150 |
| B-2 | 15.5 | 32 | 29 | — | — | 5 | 18.5 | — | 2500 | 167 |
| B-3 | 50 | — | — | — | — | — | — | 50 | 5000 | 177 |
| B-4 | 45 | — | 45 | 5 | 5 | — | — | — | 2000 | 118 |
| B-5 | 45 | 5 | 45 | 5 | — | — | — | — | 450 | 150 |

1 . . . isophthalic acid
2 . . . terephthalic acid
3 . . . hexamethylenediamine
4 . . . bis(4-amino-3-methylcyclohexyl)methane
5 . . . sebacic acid
6 . . . caprolactam
7 . . . 3-aminomethyl-3,5,5-trimethylcyclohexylamine
8 . . . methaxylenediamine

Synthesis of maleimide copolymeric resin

Approximately 100 parts of styrene, approximately 67 parts of maleic anhydride, 0.2 parts of benzoyl peroxide, and 300 parts of methyl ethyl ketone (NEK) were reacted in a nitrogen atmosphere for 10 hours at a temperature of 80° C. To the resultant polymer was added 1.2 parts of triethylamine and 46.2 parts of aniline and the resulting mixture was reacted for 6 hours at a temperature of 130° C. to obtain the maleimide copolymeric resin (C-3). Other maleimide polymeric resins were made in the same manner. The results are given in Table 3.

TABLE 3

| | Monomer Composition (mol %) | | | | | |
|---|---|---|---|---|---|---|
| Copolymer | Aromatic vinyl monomer | maleimide monomer | unsaturated dicarboxylic acid | Other Monomers* | Tg (°C.) | Melt Viscosity (poise) |
| C-1 | ST 30 | NPM 50 | | MMA 20 | 200 | 11000 |
| C-2 | ST 50 | NPM 5 | MAH 45 | | 203 | 12000 |
| C-3 | ST 60 | NPM 40 | | | 197 | 9000 |
| C-4 | ST 50 | NPM 30 | MAH 20 | | 203 | 12000 |

TABLE 3-continued

| Copolymer | Monomer Composition (mol %) | | | | Tg (°C.) | Melt Viscosity (poise) |
|---|---|---|---|---|---|---|
| | Aromatic vinyl monomer | maleimide monomer | unsaturated dicarboxylic acid | Other Monomers* | | |
| C-5 | ST 40 | NPM 60 | | | — | — |
| C-6 | ST 90 | NPM 10 | | | 120 | 2500 |
| C-7 | ST 30 | NPM 10 | MAH 60 | | — | — |
| C-8 | ST 10 | NPM 30 | | MMA 60 | — | — |
| C-9 | ST 95 | | MAH 5 | | 90 | 2300 |
| C-10 | VT 50 | NPM 50 | | | 203 | 12000 |
| C-11 | ST 50 | NTM 50 | | | 203 | 12000 |
| C-12 | ST 60 | NPM 40 | | | 198 | 55000 |

ST: styrene
VT: vinyltoluene
NPM: N-phenylmaleimide
NTM: N-tolylmaleimide
MAH: maleic anhydride
MMA: methyl methacrylate
* = copolymerizable monomers

Synthesis of amorphous polyolefin

To 60g of 6-ethylbicyclo[2.2.1]hepto-2-ene and one liter of toluene, a vanadium compound of VO-(OC$_2$H$_5$)Cl$_2$ and ethylaluminium sesquichloride were added in the amounts of 1 mmol per liter and 4 mmol per liter, respectively, in the prepared composition to be reacted. 40 liters of ethylene per hour and 80 liters of nitrogen per hour were fed to the reactor for reacting the composition therein. The copolymerization was continuously conducted at a temperature of 10° C. Subsequently, a small amount of methanol was added to inhibit polymerization. A ring olefin copolymer (D) was obtained by precipitating the amorphous polyolefin using a large amount of acetone/methanol. The resultant copolymer and its properties are shown in Table 4 below.

TABLE 4

| Co-polymer | Cyclic olefin | Ethylene contents in Cyclic olefin copolymer (mol %) | Melt Viscosity (poise) | Tg °C. |
|---|---|---|---|---|
| D | 6-ethylbicyclo [2.2.1]hepto-2-ene | 62 | 2500 | 100 |

Measuring devices and methods used in this embodiment are as follows:

Dispersed particle diameter

The dispersed particle diameter was determined from an electron micrograph of sample rupture cross-section by using a scanning electron microscope JSM-15, obtained from JEOL Ltd.

Surface roughness

Surface roughness was determined in accordance with the method defined in JIS B 0601 (1976) using a surface roughness tester obtained from the KOSAKA Co. Ltd. with a spylus of 2 μmR in radius, 10mg in pressure, and at a 50,000 height magnification.

Haze, Hz

Haze was determined in accordance with ASTN D1003-61 using a Haze meter available from the TOKYO DENSHOKU Co. Ltd.

Friction coefficien

Using a friction meter sold by the Shinto Kagaku Ltd. under the name of HEIDON-14S/DR, the static friction coefficient was determined by the plane press method ($\mu$s-1) and was measured with a flat shape indenter of $3 \times 3 cm^2$ and the static friction coefficient was determined by the line press method ($\mu$s-2) using a straight shape indenter of 15 mm in radius and 10mm in length. They were measured under a loading of lkg and a moving speed of 150 mm/min.

Refractive Index

The refractive index film a 250 μm in thickness was measured using an Abbe's refractometer IT sold by the ATAGO Ltd

Critical Surface Tension

Critical surface tension was measured at a temperature of 20° C. and a relative humidity (RH) of 50% using an automatic contact angle meter CA-Z manufactured by Kyowa Interface Science Co. Ltd.

G %

The Gloss rate at an angle of incidence to the film of 20 degrees was measured using a gloss meter GM-30 sold by the Murakami Color research Laboratory Ltd.

Melt Viscosity

Melt viscosity was measured using a flow tester CFT-500 sold by Shimadzu Corp. with an orifice of 0.5 mmo in diameter and 2mm in height at a temperature of 280° C.

(Evaluation for protuberances: the number of protuberances on the surface of a 1,000m wound roll having a width of 1 m)
Meanings of the symbols are:
X: protuberances were found at a contact pressure of 10 kg/m and a tension of 10 kg/m on film slitting;

◯: no protuberances were found at a contact pressure of 10 kg/m and tension of 10 kg/m upon film slitting and less than five protuberances were found under a contact pressure of 20 kg/m and tension of 20 kg/m; and ⊚: no protuberances were found with a contact pressure of 10 kg/m and a tension of 10 kg/m or with a contact pressure of 20 kg/m and tension of 20 kg/m.

EXAMPLES 1 to 3

95 wt. % of thermoplastic polyester resin (A-i) and 5 wt. % of amorphous nylons (B-1 to B-B) were melted and blended into pellets at a temperature of 280° C. using a biaxial kneading extruder, Thereafter, the resultant pellets and the thermoplastic (A-1) were formulated in the ratios set forth below in Table 5 by means of a two-kind-three-layer T-die using two extruders of 50mmo and 65mmo. Three-layer laminated polyester films having a thickness of 700 μm were obtained, where the mixed pellets were formed as outer layers (56 μm x 2) and PET (A-1) was formed as an inner layer (588 μm) In order to measure the diameter of particles of the thermoplastic resin dispersed in the undrawn film, the measurements were determined from an electron micrograph of the rupture cross-section of a sample obtained by exposing the undrawn film to frost-rupture in liquid nitrogen along the takeup direction or machine direction ( MD ) of the film. The undrawn film was then drawn in longitudinal direction (machine direction) by a factor of three and one-half using a longitudinal drawing roll at a temperature of 90° C. and successively drawn in the transverse direction (cross-direction) by a factor of four using a transverse tenter drawing machine at an elevated temperature of 120° C.

Formulations, properties of the thermoplastic resin (amorphous nylon), dispersed particle diameters of the thermoplastic resin and properties of the drawn films are shown in Tables 5 to 8. It is clear from these tables that the film fabricated in accordance with the present invention exhibits superior surface roughness, haze, static friction coefficient by line press method, and protuberance free surfaces when compared to controls, critical surface tension, melt viscosity as defined by the present invention, preferred the refractive index and the dispersed particle diameter.

Control 1

The thermoplastic polyester resin prepared with A-2 and the thermoplastic resin prepared with B-4 were pelletized after being kneaded in the same formulation as Examples 1 to 3. Thereafter, the undrawn film was obtained in the same manner as described in Examples 1 to 3 using the thermoplastic polyester resin A-2 for the inner layer. The film was drawn under the same conditions as described in Examples 1 to 3 except that the drawing temperature for the longitudinal roll was 130° C. and that for the transverse tenter extruder was 150° C. The properties of the drawn film are shown in Table 7. It can be seen from Table 7 that thermoplastic resins having a Tg lower than that of the thermoplastic polyester resin exhibited high transparency whereas the lubricity was not suitable and some protuberances were found.

Control 2

The drawn film was prepared in the same manner as described in Examples 1 to 3 except that a nylon6 (Tg of 45° C.) was used as the thermoplastic resin.

Like the foregoing control 1, thermoplastic resins having a Tg lower than that of the thermoplastic polyester were used, resulting in high transparency, whereas the lubricity was not suitable and some protuberances were found.

Controls 3 to 5

The drawn film was prepared in the same manner as described in Examples 1 to 3 with the thermoplastic polyester resin and the thermoplastic resin as set forth in Table 5 in accordance with the ratio as set forth in Table 5. The result is shown in Table 7. It was found that the resultant film inevitably exhibited excessive haze with the contents and the melt viscosity of the thermoplastic resin both being within the range defined by the present invention, while only the film having protuberances on its surface was obtained even when the haze was lower than 2.5%.

Controls 6 to 8

Silica SY-150 sold by Nippon Shokubai Co.Ltd. was added to the thermoplastic polyester resin (A) upon its polymerization and a silica master pellet was substituted for the thermoplastic resin (b) in Examples 1 to 3 to obtain the drawn film in the same manner as described in Examples 1 to 3. The processing conditions are given in Table 5 and the results in Table 7.

It was found from these controls that a film of high quality was not obtained because protuberances were generated on the surface of the film roll or the haze were higher than 2.5 %.

EXAMPLES 4 to 10

The drawn film was fabricated in the same manner as described in Examples 1 to 3 except that the silica set forth in Tables 5 and 6 was added in a concentration set forth in Tables 5 and 6 with a preformed master pellet like the foregoing Example 2. The results are shown in Tables 7 and 8. It was found that advantageous effects and superior results were obtained by means of joint use of the thermoplastic resin and the particulate inert inorganic compound in the thermoplastic polyester resin.

Control 9

The same process as in Example 4 was employed using silica having a larger particle diameter than that defined by the present invention, as shown in Tables 6 and 8. As a result, it was found that the film exhibited lower transparency but good lubricity when the thermoplastic resin (b) was added.

Control 10

The same method as Example 4 was employed except that the thermoplastic resin had a Tg as shown in Tables 6 and 8. As a result, it was found that the film exhibited undesirable lubricity as well as high transparency and some protuberances were generated when silica was present in the manner defined by the present invention.

EXAMPLES 11 to 14

Tables 6 and 8 show that the transparency and the lubricity of the film was not affected by using the maleimide copolymeric resin and the amorphous polyolefin as the thermoplastic resin (b).

Control 11

The film was prepared in the same manner as Example 4 except that the drawing was made only with the longitudinal drawing roll a drawing ratio of 1.4. Some protuberances were found on the film surface.

Control 12

The processing was as in Example 1 except that the maleimide copolymeric resin (C-12) having a melt viscosity greater than that defined by the present invention was used as the thermoplastic resin (b). As a result. it was found that the transparency of the film degraded with the particles of larger particle diameter.

Control 13

The same processing was used as in Example 4 exceept that the silica was 0.1 μm in diameter. As a result, it was found that the properties of the film were similar to that in Example 2 with the particulate inert inorganic compound having a diameter smaller than the range defined by the present invention, showing it is not effective to add such a the particulate inert inorganic compound.

TABLE 5

| | Thermoplastic Polyester Resin (a) | Thermoplastic Resin (b) | | | | | | Inorganic Inert Particles | | | |
|---|---|---|---|---|---|---|---|---|---|---|---|---|
| | | Formulations | Tg (°C.) | Added Amount (wt. %) | Dispersed Particle Diameter (μm) | Critical Surface Tension (dyne/cm) | Refractive Index | Melt Viscosity (poise) | Formulation | Added Amount (wt. %) | Particle Diameter (μm) | Refractive Index |
| Example 1 | A-1 | B-1 | 150 | 0.1 | 0.21 | 46 | 1.49 | 2600 | — | — | — | — |
| Example 2 | A-1 | B-2 | 167 | 0.1 | 0.25 | 44 | 1.48 | 4000 | — | — | — | — |
| Example 3 | A-1 | B-3 | 177 | 0.1 | 0.20 | 44 | 1.62 | 5000 | — | — | — | — |
| Control 1 | A-2 | B-4 | 118 | 0.1 | 0.18 | 46 | 1.49 | 2000 | — | — | — | — |
| Control 2 | A-1 | NYLON6 | 45 | 0.1 | 0.18 | 44 | 1.53 | 2000 | — | — | — | — |
| Control 3 | A-1 | B-2 | 167 | 0.005 | 0.17 | 44 | 1.48 | 4000 | — | — | — | — |
| Control 4 | A-1 | B-2 | 167 | 4.0 | 0.85 | 44 | 1.48 | 4000 | — | — | — | — |
| Control 5 | A-1 | B-5 | 150 | 0.1 | 0.05 | 46 | 1.49 | 400 | — | — | — | — |
| Control 6 | A-1 | — | — | — | — | — | — | — | silica | 0.0045 | 2.0 | 1.44 |
| Control 7 | A-1 | — | — | — | — | — | — | — | silica | 0.005 | 2.0 | 1.44 |
| Control 8 | A-1 | — | — | — | — | — | — | — | silica | 0.0001 | 2.0 | 1.44 |
| Example 4 | A-1 | B-2 | 167 | 0.1 | 0.25 | 44 | 1.48 | 4000 | silica | 0.0045 | 2.0 | 1.44 |
| Example 5 | A-1 | B-2 | 167 | 0.1 | 0.25 | 44 | 1.48 | 4000 | silica | 0.030 | 2.0 | 1.44 |
| Example 6 | A-1 | B-2 | 167 | 0.1 | 0.25 | 44 | 1.48 | 4000 | silica | 0.0005 | 2.0 | 1.44 |

TABLE 6

| | Thermoplastic Polyester Resin (a) | Thermoplastic Resin (b) | | | | | | | Inorganic Inert Particles | | | |
|---|---|---|---|---|---|---|---|---|---|---|---|---|
| | | Formulations | Tg (°C.) | Added Amount (wt. %) | Dispersed Particle Diameter (μm) | Critical Surface Tension (dyne/cm) | Refractive Index | Melt Viscosity (poise) | Formulation | Added Amount (wt. %) | Particle Diameter (μm) | Refractive Index |
| Example 7 | A-1 | B-2 | 167 | 2.5 | 0.41 | 44 | 1.48 | 4000 | silica | 0.0001 | 2.0 | 1.44 |
| Example 8 | A-1 | B-2 | 167 | 0.01 | 0.20 | 44 | 1.48 | 4000 | silica | 0.050 | 2.0 | 1.44 |
| Control 9 | A-1 | B-2 | 167 | 0.1 | 0.25 | 44 | 1.48 | 4000 | silica | 0.0045 | 5.0 | 1.44 |
| Example 9 | A-1 | B-2 | 167 | 0.01 | 0.20 | 44 | 1.48 | 4000 | silica | 0.050 | 2.0 | 1.68 |
| Example 10 | A-1 | B-3 | 177 | 0.1 | 0.20 | 44 | 1.62 | 5000 | silica | 0.0045 | 2.0 | 1.44 |
| Control 10 | A-1 | NYLON6 | 45 | 0.1 | 0.18 | 44 | 1.53 | 2000 | silica | 0.0045 | 2.0 | 1.44 |
| Example 11 | A-1 | C-3 | 197 | 0.1 | 0.41 | 40 | 1.59 | 9000 | — | — | — | — |
| Example 12 | A-1 | C-3 | 197 | 0.1 | 0.41 | 40 | 1.59 | 9000 | silica | 0.0045 | 2.0 | 1.44 |
| Example 13 | A-1 | D | 100 | 0.1 | 0.38 | 30 | 1.51 | 2500 | — | — | — | — |
| Example 14 | A-1 | D | 100 | 0.1 | 0.38 | 30 | 1.51 | 2500 | silica | 0.0045 | 2.0 | 1.44 |
| Control 11 | A-1 | B-2 | 167 | 0.1 | 0.25 | 44 | 1.48 | 4000 | silica | 0.0045 | 2.0 | 1.44 |
| Control 12 | A-1 | C-12 | 198 | 0.1 | 1.21 | 40 | 1.59 | 55000 | — | — | — | — |
| Control 13 | A-1 | B-2 | 167 | 0.1 | 0.25 | 44 | 1.48 | 4000 | silica | 0.0045 | 0.1 | 1.44 |

TABLE 7

| | Film Surface Roughness | | Film Properties | | | | |
|---|---|---|---|---|---|---|---|
| | SRa μm | SRz μm | Hz % | G % | μs-1 | μs-2 | Protuberances |
| Example 1 | 0.0084 | 0.110 | 0.8 | 245 | 0.48 | 0.56 | ○ |
| Example 2 | 0.0072 | 0.132 | 0.7 | 244 | 0.47 | 0.55 | ○ |
| Example 3 | 0.0066 | 0.138 | 0.5 | 240 | 0.45 | 0.52 | ○ |
| Control 1 | 0.0045 | 0.009 | 0.9 | 253 | 1.20 | 2.76 | X |
| Control 2 | 0.0038 | 0.009 | 1.0 | 254 | 1.25 | 3.52 | X |
| Control 3 | 0.0039 | 0.080 | 0.9 | 251 | 1.22 | 3.31 | X |
| Control 4 | 0.07 | 1.80 | 6.9 | 145 | 0.41 | 0.49 | ○ |
| Control 5 | 0.0050 | 0.008 | 1.8 | 249 | 0.68 | 2.41 | X |
| Control 6 | 0.0092 | 0.39 | 0.5 | 253 | 1.09 | 2.83 | X |
| Control 7 | 0.0045 | 2.1 | 4.8 | 169 | 0.41 | 0.51 | ○ |
| Control 8 | 0.0013 | 0.148 | 0.3 | 260 | 1.25 | 3.52 | X |
| Example 4 | 0.0120 | 0.33 | 0.9 | 235 | 0.31 | 0.48 | ⊙ |
| Example 5 | 0.0138 | 0.38 | 1.9 | 221 | 0.25 | 0.47 | ⊙ |
| Example 6 | 0.0074 | 0.18 | 0.8 | 243 | 0.35 | 0.48 | ⊙ |

TABLE 8

| | Film Surface Roughness | | Film Properties | | | | |
|---|---|---|---|---|---|---|---|
| | SRa μm | SRz μm | Hz % | G % | μs-1 | μs-2 | Protuberances |
| Example 7 | 0.019 | 0.42 | 2.4 | 218 | 0.24 | 0.45 | ⊙ |
| Example 8 | 0.0081 | 0.38 | 1.9 | 220 | 0.23 | 0.46 | ⊙ |
| Control 9 | 0.062 | 2.30 | 3.8 | 201 | 0.29 | 0.46 | ⊙ |
| Example 9 | 0.0080 | 0.42 | 0.9 | 228 | 0.23 | 0.45 | ⊙ |
| Example 10 | 0.0071 | 0.43 | 0.7 | 236 | 0.27 | 0.42 | ⊙ |

TABLE 8-continued

| | Film Surface Roughness | | Film Properties | | | | |
|---|---|---|---|---|---|---|---|
| | SRa μm | SRz μm | Hz % | G % | μs-1 | μs-2 | Protuberances |
| Control 10 | 0.0037 | 0.32 | 1.5 | 234 | 0.87 | 2.55 | X |
| Example 11 | 0.0073 | 0.14 | 1.6 | 241 | 0.57 | 0.56 | ○ |
| Example 12 | 0.0080 | 0.37 | 1.9 | 230 | 0.43 | 0.52 | ⊚ |
| Example 13 | 0.0069 | 0.12 | 1.8 | 248 | 0.56 | 0.54 | ○ |
| Example 14 | 0.0078 | 0.35 | 2.0 | 220 | 0.42 | 0.44 | ⊚ |
| Control 11 | 0.0031 | 0.075 | 0.8 | 255 | 1.23 | 3.52 | X |
| Control 12 | 0.064 | 2.31 | 3.9 | 198 | 0.31 | 0.49 | ○ |
| Control 13 | 0.0071 | 0.132 | 0.7 | 244 | 0.46 | 0.55 | ○ |

Examples 15 to 17

PET (A-1) with amorphous nylon (B-1) was melted, mixed and formed into pellets using a biaxial kneading extruder at a temperature of 280° C. in differing mixture ratios.

Subsequently, these pellets were melted at the same temperature of 280° C. using an extruder of 50 mmo and extruded from a T-die into a film having a thickness of approximately 500 μm. The resultant undrawn film was uniaxially drawn by a factor of three using a two-roll uniaxial drawing machine at a temperature of 90° C. Film properties are shown in Table 9, where it can be seen that these drawn films are superior in mechanical properties, lubricity and transparency.

TABLE 9

| Case No. | Weight ratio of (A-1):(B-1) | Mechanical Properties | Hz (%) | μs-1 | μs-2 |
|---|---|---|---|---|---|
| Example 15 | 99.9:0.1 | well | 1.0 | 0.57 | 0.63 |
| Example 16 | 99.0:1.0 | well | 1.5 | 0.49 | 0.56 |
| Example 17 | 97.0:3.0 | well | 2.5 | 0.40 | 0.50 |

EXAMPLE 18

The undrawn film as in Example 17 was simultaneously drawn in both longitudinal and transverse directions by a factor of 3.3 at a temperature of 100° C., and was heatset thereafter at an elevated temperature of 230° C. The properties of the resultant drawn film were good as shown in Table 10. In this event, the measuring direction is the longitudinal direction of the film.

TABLE 10

| | Unit | Value L* | T* |
|---|---|---|---|
| Breaking Strength | kg/mm² | 21 | 20 |
| Breaking Extension | % | 135 | 120 |
| Heat Shrinkage (160° C. × 15 min.) | % | 1.4 | 0.1 |
| μs-2 | | 0.53 | |

*L = longitudinal direction
*T = transversel direction

EXAMPLE 19

With a co-extruding film fabricating device having three extruders of 40 mmφ, an undrawn laminated film was fabricated such that a polyethylene terephthalate layer of 300 μm was formed between 100 μm layers of mixed resin having a composition identical to that of Example 16. This undrawn film was longitudinally drawn by a factor of 3.3 using a rolltype longitudinal drawing machine at an elevated temperature of 90° C. Subsequently, it was transversally drawn by a factor of 3.4 using a tenter drawing machine at an elevated temperature of 100° C. to immediately carry out heatsetting.

The surface roughness of the drawn film was relatively high as shown in Table 11 and the lubricity thereof was adequate. In this case, the measuring direction was the longitudinal direction of the film.

TABLE 11

| | Unit | Value L* | T* |
|---|---|---|---|
| Breaking Strength | kg/mm² | 24 | 23 |
| Breaking Extension | % | 120 | 115 |
| Heat Shrinkage (160° C. × 15 min.) | % | 1.0 | 0.1 |
| μs-2 | | 0.78 | |

*L = longitudinal direction
*T = transversel direction

EXAMPLE 20, Controls 14 and 15

An uniaxial drawing test was conducted using the amorphous nylons (B-4), (B-1) and PEN (A-2) in a similar manner as Examples 15 to 17 with the compositions and temperatures shown in Table 12. As clearly seen from Table 12, Tg and the drawing-temperature of the amorphous nylon play important roles in roughening the film surface.

TABLE 12

| Case No. | Weight ratio of (A-2):(B-1):(B-4) | Drawing Temperature (°C.) | μs-1 | μs-2 |
|---|---|---|---|---|
| Example 20 | 99:1.0:0 | 140 | 0.52 | 0.60 |
| Control 14 | 99:1.0:0 | 160 | 1.2 | 3.31 |
| Control 15 | 99:0:1.0 | 140 | 1.2 | 3.38 |

Examples 21 to 23

PET (A-1) and the maleimide copolymeric resin (C-3) were melted, mixed and formed into pellets using a biaxial kneading extruder at a temperature of 280° C. in differing mixture ratios.

Subsequently, these pellets were melted at the same temperature of 280° C. using an extruder of 50 mmo and extruded from a T-die into a film having a thickness of approximately 500 μm. The resultant undrawn film was uniaxially drawn by a factor of three using a two-roll uniaxial drawing machine at a temperature of 90° C. Compositions are shown in Table 13, where it can be seen that these drawn films were superior in mechanical properties and transparency. In addition, no measured static friction coefficient was larger than 1.0. This means that the films have considerably high lubricity.

TABLE 13

| Case No. | Weight ratio of (A-1):(C-3) | Tensile Strength (Kg/mm²) | Hz (%) | μs-1 | μs-2 |
|---|---|---|---|---|---|
| Example 21 | 99.9:0.1 | 21 | 1.0 | 0.57 | 0.56 |
| Example 22 | 99.0:1.0 | 22 | 1.5 | 0.49 | 0.48 |
| Example 23 | 97.0:3.0 | 20 | 3.1 | 0.40 | 0.41 |

EXAMPLE 24

An undrawn film like that of Example 23 was simultaneously drawn in both longitudinal and transverse directions by a factor of 3.3 at a temperature of 100° C., and was heatset thereafter at an elevated temperature of 230° C. The properties of the resultant drawn film were good as shown in Table 14.

TABLE 14

| | Unit | Value L* | Value T* |
|---|---|---|---|
| Tensile Strength | kg/mm² | 22 | 21 |
| Breaking Extension | % | 120 | 115 |
| Heat Shrinkage (160° C. × 15 min.) | % | 1.2 | 0.1 |
| μs-2 | | | 0.52 |

*L = longitudinal direction
*T = transversel direction

EXAMPLES 25 to 29 and Controls 16 to 19

PET(A-1) and the maleimide copolymeric resin at a ratio of 99.9:0.1 were fabricated into an undrawn film in accordance with the method as described in Examples 21 to 23, and also fabricated into a drawn film in accordance with the method as described in Example 24 to demonstrate the effect of each maleimide copolymer resin. The results are shown in Table 15. From Table 15, it is seen that the optimum drawability and properties of films were achieved with a maleimide copolymeric resin having the following composition: maleimide monomer in amount of 5 to 50 mol %, unsaturated dicarboxylic anhydride monomer groups in amount of 0 to 50 mol %, aromatic vinyl monomer groups in amount of 30 to 90 mol %, and other copolymerizable monomer groups in amount of 0 to 50 mol %, with any other ratio more or less adversely to degrading drawability and performance of the film.

TABLE 15

| Case No. | Maleimide Copolymer | Drawability | Tensile Strength (Kg/mm²) | Hz (%) | μs-1 | μs-2 |
|---|---|---|---|---|---|---|
| Example 25 | C-1 | good | 23 | 1.3 | 0.49 | 0.56 |
| Example 26 | C-2 | good | 20 | 1.2 | 0.48 | 0.56 |
| Example 27 | C-4 | good | 23 | 1.2 | 0.50 | 0.57 |
| Example 28 | C-10 | good | 22 | 1.0 | 0.48 | 0.56 |
| Example 29 | C-11 | good | 24 | 1.0 | 0.47 | 0.55 |
| Control 16 | C-5 | broken | — | — | — | — |
| Control 17 | C-7 | broken | — | — | — | — |
| Control 18 | C-8 | broken | — | — | — | — |
| Control 19 | C-9 | good | 9 | 1.5 | 2.10 | 6.76 |

With a co-extruding film fabricating device having three extruders of 40 mmφ. an undrawn laminated film was fabricated such that a polyethylene terephthalate layer of 300 μm was formed between 100 μm layers of mixed resin having a composition identical to that of Example 22. This undrawn film was longitudinally drawn by a factor of 3.3 using a roll-type longitudinal drawing machine at a temperature of 90° C. Subsequently, it was transversally drawn by a factor of 3.4 using a tenter drawing machine at an elevated temperature of 100° C. to immediately carry out heatsetting.

The surface roughness of the drawn film was relatively high as shown in Table 16 and the lubricity thereof was adequate. Further, the mechanical properties were also superior as shown in Table 16.

TABLE 16

| | Unit | Value L* | Value T* |
|---|---|---|---|
| Tensile Strength | kg/mm² | 24 | 22 |
| Breaking Extension | % | 130 | 125 |
| Heat Shrinkage (160° C. × 15 min.) | % | 1.0 | 0.1 |
| μs-2 | | | 0.53 |

*L = longitudinal direction
*T = transversel direction

Example 31 and Controls 20 and 21

An uniaxial drawing test was conducted using the maleimide copolymeric resins (C-3), (C-6) and PEN (A-2) in a similar manner as Examples 21 to 23 with the compositions and temperatures set forth in Table 17. As clearly shown in Table 17, Tg and the drawing temperature of the amorphous nylon play important roles in roughening the film surface.

TABLE 17

| Case No. | Weight ratio of (A-2):(C-3):(C-6) | Drawing Temperature (°C.) | μs-1 | μs-2 |
|---|---|---|---|---|
| Example 31 | 99:1.0:0 | 140 | 0.52 | 0.57 |
| Control 20 | 99:1.0:0 | 200 | 1.2 | 3.51 |
| Control 21 | 99:0:1.0 | 100 | 1.2 | 3.51 |

What is claimed is:

1. A surface-roughened film comprising at least one layer containing 97 to 99.99 wt. % of a thermoplastic polyester resin (a) and 0.01 to 3 wt. % of a particulate maleimide copolymeric resin (b) having a glass transition temperature higher than that of said thermoplastic polyester resin (a), a critical surface tension more than 0.1 dyne/cm different from that of said thermoplastic polyester resin (a), and a melt viscosity in the range of 500 to 50,000 poise at a temperature of 280° C. and shear rate of $10^2$ sec$^{-1}$, wherein said particulate maleimide copolymeric resin (b) is dispersed as a discontinuous phase in resin (a), said film having at least one surface with microprotuberances with cores of said thermoplastic resin (b).

2. A surface-roughened film as claimed in claim 1, wherein three dimensional center plane average roughness (SRa) of the surface-roughened film is within a range of 0.005 to 0.05 μm, and three dimensional ten point average roughness (SRz) is within a range of 0.06 to 0.4 μm.

3. A surface-roughened film comprising at least one layer containing 96.9 to 99.9899 wt. % of a composition (II) containing a thermoplastic polyester resin (a) and 0.01 to 3 wt. % of a particulate thermoplastic resin (b) having a glass transition temperature higher than that of said thermoplastic polyester resin (a), a critical surface tension more than 0.1 dyne/cm different from that of said thermoplastic polyester resin (a), and a melt viscosity in the range of 500 to 50,000 poise at a temperature of 280 C. and shear rate of $10^2$ sec$^{-1}$; and 0.0001 to 0.1 wt. % of a particulate inert inorganic compound (c) having an average particle size in the range of 0.2 to 4.0 μm, wherein said particulate thermoplastic resin (b) is dispersed as a discontinuous phase in resin (a) and is selected from the group consisting of amorphous nylons, maleimide copolymers and amorphous polyolefins, said film having at least one surface with micro-protuberances with cores of said thermoplastic resin (b).

4. A surface-roughened film as claimed in claim 3, wherein said thermoplastic resin (b) is an amorphous nylon.

5. A surface-roughened film as claimed in claim 3, wherein said thermoplastic resin (b) is a maleimide copolymeric resin.

6. A surface-roughened film as claimed in claim 3, wherein said thermoplastic resin (b) is an amorphous polyolefin.

7. A surface-roughened film as claimed in claim 3, wherein the refractive index of said thermoplastic resin (b) is in the range of 1.45 to 1.68.

8. A surface-roughened film as claimed in claim 3, wherein the mean dispersed particle size in the range of 0.01 to 1.0 μm.

9. A surface-roughened film as claimed in claim 3, wherein said particulate inert inorganic compound (c) is silica.

10. A surface-roughened film as claimed in claim 3, wherein the three dimensional center plane average roughness (SRa) of the surface-roughened film is within a range of 0.007 to 0.07 μm, and the three dimensional ten point average roughness (SRz) is within a range of 0.1 to 0.5 μm.

11. A surface-roughened film as claimed in claim 1, wherein said thermoplastic resin (b) is an amorphous nylon.

12. A surface-roughened film as claimed in claim 1, wherein the refractive index of said thermoplastic resin (b) is in the range of 1.45 to 1.68.

13. A surface-roughened film as claimed in claim 1, wherein a mean dispersed particle size is in the range of 0.01 to 1.0 μm.

14. A surface-roughened film comprising at least one layer containing 97 to 99.99 wt. % of a thermoplastic polyester resin (a) and 0.01 to 3 wt. % of a particulate thermoplastic resin (b) having a glass transition temperature higher than that of said thermoplastic polyester resin (a), a critical surface tension more than 0.1 dyne/cm different from that of said thermoplastic polyester resin (a), and a melt viscosity in the range of 500 to 50,000 poise at a temperature of 280° C. and shear rate of $10^2$ sec$^{-1}$, wherein said particulate thermoplastic resin (b) is dispersed as a discontinuous phase in resin (a) and is an amorphous polyolefin, said film having at least one surface with micro-protuberances with cores of said thermoplastic resin (b).

15. A surface-roughened film as claimed in claim 14 wherein three dimensional center plane average roughness (SRa) of the surface-roughened film is within a range of 0.005 to 0.05 μm, and three dimensional ten point average roughness (SRz) is within a range of 0.06 to 0.4 μm.

16. A surface-roughened film as claimed in claim 14, wherein a refractive index of said thermoplastic resin (b) is in the range of 1.45 to 1.68.

* * * * *

UNITED STATES PATENT AND TRADEMARK OFFICE
CERTIFICATE OF CORRECTION

PATENT NO. : 5,354,595
DATED : October 11, 1994
INVENTOR(S) : YAMAMOTO et al

It is certified that error appears in the above-indentified patent and that said Letters Patent is hereby corrected as shown below:

Col. 3, line 10, "0,005" should read --0.005--.

Col. 5, line 55, "0,001" should read --0.001--.

Col. 12, line 18, "0,015" should read --0.015--; and
        line 27, "(B-i) should read --(B-1)--.

Col. 14, line 63, "(A-i)" should read --(A-1)--; and
        line 64, "(B-B)" should read --(B-3)--.

Col. 18, Control 7, under the heading "Added Amount (wt.%)", "0.005" should read --0.050--.

Col. 21, before line 10, after Table 13, insert --(Measuring direction: the longitudinal direction of the film)--.

Signed and Sealed this

Twenty-ninth Day of August, 1995

BRUCE LEHMAN

Attest:

Attesting Officer          Commissioner of Patents and Trademarks